United States Patent [19]

Meyer

[11] Patent Number: 4,626,439
[45] Date of Patent: Dec. 2, 1986

[54] METHOD FOR PRODUCING THIN PORTIONS OF PASTA FILATA CHEESE

[76] Inventor: Marco M. Meyer, 2038 Green Tree Rd., Junction City, Wis. 54443

[21] Appl. No.: 750,311

[22] Filed: Jun. 27, 1985

Related U.S. Application Data

[63] Continuation of Ser. No. 621,451, Jun. 18, 1984, abandoned.

[51] Int. Cl.$^4$ .......................... A23P 1/00; A23C 19/00
[52] U.S. Cl. ...................................... 426/517; 426/582
[58] Field of Search ............... 426/517, 582, 515, 512, 426/518, 516

[56] References Cited

U.S. PATENT DOCUMENTS 3,697,292 10/1972 Lauck et al. .......................... 426/582
3,887,719 6/1975 Miller ................................. 426/512
4,288,465 9/1981 Meyer ................................. 426/517
4,339,468 7/1982 Kielsmeier .......................... 426/517

Primary Examiner—Raymond N. Jones
Assistant Examiner—Carolyn Paden
Attorney, Agent, or Firm—Andrus, Sceales, Starke & Sawall

[57] ABSTRACT

A technique for producing sliced, shredded and/or diced cheese of the pasta filata type. The technique utilizes a plurality of rollers which reduce an extruded strand of cheese to a ribbon of the desired thickness. The rollers are heated and a spray of warm water is applied to the cheese to keep the ribbon plastic and pliable. The edges of the sheet are trimmed, and then the sheet is run through a brine tank or sprayed with a brine mixture to salt the sheet for the desired amount of time. Thereafter, the sheet is cooled and cut into any desired shaped to create an end product of controlled size and weight. The trimmings are returned to the extruder, reheated, and reused.

21 Claims, 4 Drawing Figures

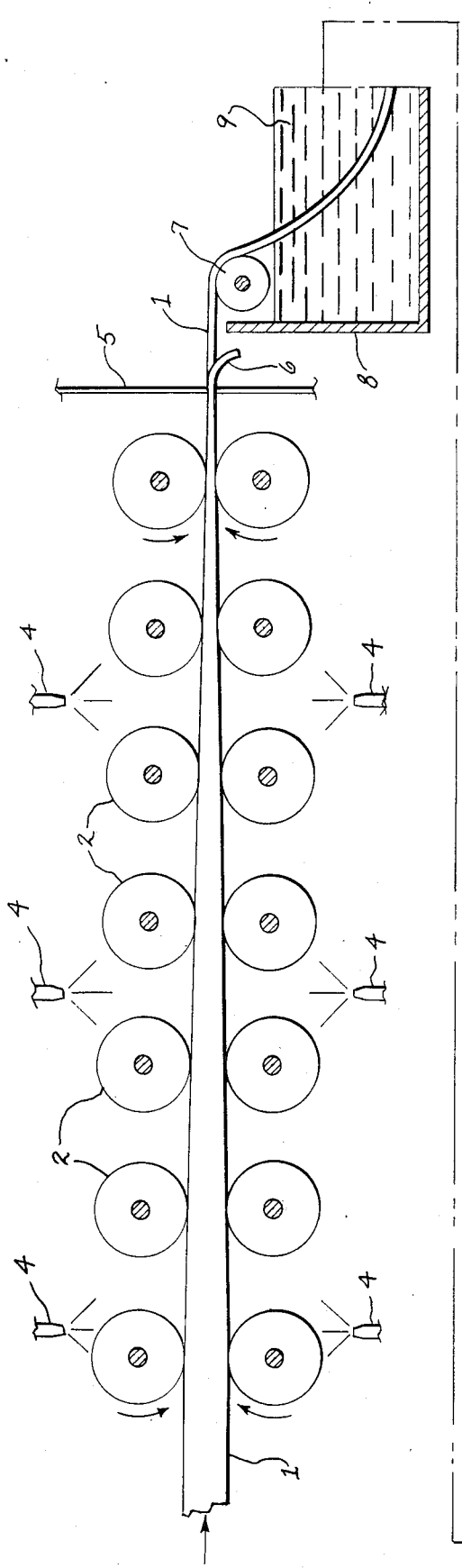
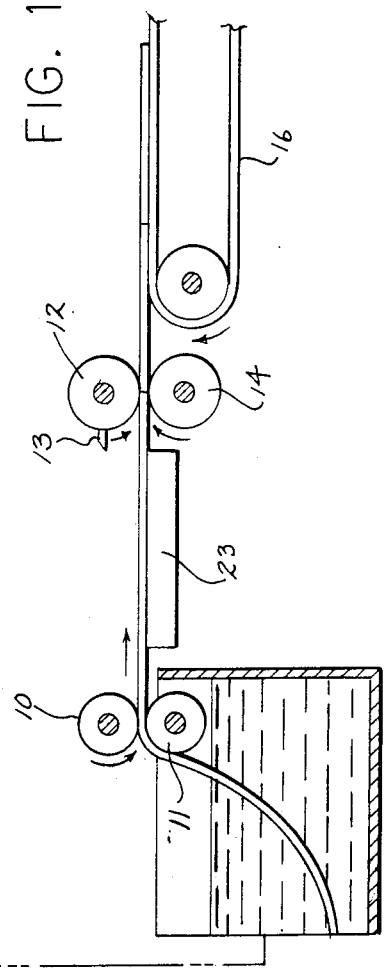
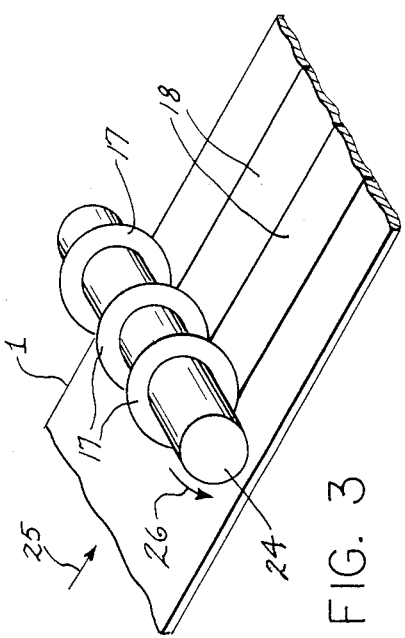
FIG. 1
FIG. 3

METHOD FOR PRODUCING THIN PORTIONS OF PASTA FILATA CHEESE

CROSS REFERENCE TO RELATED APPLICATION

The present application is a continuation application of U.S. patent application Ser. No. 621,451, filed June 18, 1984 and now abandoned.

BACKGROUND OF THE INVENTION

1. Field of the Invention

The present invention relates to a method for producing food, and more particularly to a technique for producing sliced, shredded and/or diced cheese of the pasta filata type. Particularly suited are mozzarella and provolone.

2. Description of the Prior Art

Pasta filata cheeses, such as mozzarella, provolone, or blends thereof, become plastic i.e. moldable and pliable when heated. The plastic nature of pasta filata cheeses is to be distinguished from other types of cheeses such process cheeses that become molten upon heating.

Pasta filata cheese is manufactured by cooking, mixing and stretching a curd of the pasta filata type. The warm plastic curd is then typically molded into a six pound or twenty pound block. The block is then immersed in brine for twenty four hours after which it is removed, wrapped and aged. Aging facilitates a proteolytic process within the cheese that provides desired physical properties such as improving its slicability by mitigating against brittleness. This process typically takes seven to ten days and requires intermediate packaging prior to slicing, shredding and/or dicing to protect the cheese from mold.

At present pasta filata cheeses are typically shredded, diced or sliced for use in foods such as pizza. In order to accomplish this, the cheese blocks must be taken from storage, unwrapped, and then shredded, diced or sliced. Such an operation is labor intensive and requires a completely different line in the manufacturing facility resulting in increased costs of production. Additionally, requiring intermediate storage for the cheese also dictates that the cheese be packaged for storage. Thus, the use of intermediate packaging materials also represents significant lost dollars.

The food industry places a premium on portion control as a means of insuring the use of precise amounts of ingredients. For shredded and diced cheese, either a scale or volume measuring have generally been used for portion control. Slices are a means for providing portion control of cheese on pizzas without using the additional step of weighing. However, to provide such control the block of pasta filata cheese must be trimmed to exact dimensions and then cut to slices of predetermined thickness. As noted above, this results in added labor expense, and additionally creates an enormous amount of trim or waste. To produce a circular slice for pizza also creates large amounts of waste or requires special block molds of a cumbersome nature.

It is thus desirable to provide a technique for continuously producing sliced, shredded and/or diced cheese of exact size and weight.

SUMMARY OF THE INVENTION

A method for producing cheese of a pasta filata type, such as mozzarella, provolone and blends thereof.

The method includes the steps of placing the cheese in a heated, deformable state, forming an extended ribbon of cheese, applying pressure to the ribbon of cheese to reduce its thickness to a predetermined size, and cutting the flattened ribbon. The process enables various forms of cheese to be produced in a continuous manner as a contiguous extension of the cooking and stretching line of a cheese manufacturing plant. The process thus eliminates the need for interim packaging as well as the need for a different line and additional labor normally necessary to slice, shred or dice block cheese of this type.

In order to accomplish these objectives, the step of applying pressure to the cheese ribbon is further defined as passing the ribbon of cheese through a series of successively more closely spaced rollers to reduce the thickness of the ribbon to a predetermined size corresponding to the desired thickness. This thickness can be varied by adjusting the spacing between the rollers. Thus, a cheese ribbon of varying thicknesses can be produced depending upon the end use of the cheese.

In order to keep the cheese ribbon in a plastic and pliable condition, the cheese is maintained in a heated state of between about 120° F. to about 160° F. depending upon the particular character of the cheese being processed while the thickness dimension of the cheese ribbon is being reduced. In order to accomplish this, the rollers are heated and a heated fluid such as hot water is sprayed on both sides of the cheese ribbon.

After the cheese ribbon exits from the rollers and has reached its final thickness dimension, its rough edges are trimmed to provide the cheese ribbon with a uniform width. The trimmed portions or "rework" are then fed back to the cooker where it is heated into a deformable state for reforming into a ribbon of cheese. At this stage the cheese can be reworked without significant loss of product quality and integrity since the trimmed portions are recycled to the cooker before they are cooled and salted. This reduces waste and manufacturing costs.

After the cheese ribbon has been rolled and trimmed to its final dimensions, it is salted and cooled. The salting is accomplished by passing the cheese ribbon through a brine bath which is maintained at about 15°–40° F. with about a 65–90% salt solution, or by spraying a like brine solution against opposite surfaces of the cheese ribbon. Brining time i.e. salting and cooling time is reduced from about 24 hours generally required for blocks to a maximum of about 15 minutes for the cheese ribbon. This is due to the fact that there is much more cheese surface exposed to facilitate the cooling and salting.

Although the salting or brining step results in some cooling, it is preferred that the primary cooling of the cheese ribbon take place after salting by passing the ribbon over a glycol-filled cooling table. Alternately, the cheese ribbon could snake around a plurality of glycol-filled rollers or other cooling means.

After the cooling and brining step the cheese ribbon is ready for final cutting to produce shredded, diced and/or sliced cheese. The final cutting produces cheese portions of the desired weight and size. Additionally, the finished product may then be packaged and sent to a warehouse as opposed to blocks which require interim storage and packaging. Thus, the process eliminates the need for interim packaging and the materials and labor cost which accompanies such storage.

An apparatus for producing shredded, diced and/or sliced cheese of a pasta filata type includes means for forming a heated, deformable ribbon of cheese, means for applying pressure to the ribbon of cheese to flatten the cheese to a predetermined thickness, and means located downstream of the pressure applying means for cutting the flattened ribbon.

In order to flatten the cheese ribbon, it is passed through a series of successively more closely spaced rollers so that as the ribbon exits from the nip of the last set of rollers it has been reduced in thickness to the desired size. The rollers may include textured surfaces in the shape of dimples which aid in driving the cheese through the rollers and provide for kneading the cheese ribbon. Also, the upstream rollers may be convex in shape to aid in initial flattening of the cheese ribbon, and the downstream rollers become progressively more cylindrical in shape and successively more closely spaced to provide exact thickness dimension control for the cheese ribbon.

After the cheese ribbon is reduced to its final thickness, its edges are trimmed by a pair of wires, "squeeze" knives, motorized knives, or other means extending normal to the direction of travel of the ribbon. The apparatus also includes means for returning the trimmed portions to the cooker for reworking purposes thus reducing waste.

The apparatus also includes means for applying a brining fluid to the cheese ribbon subsequent to its edge trimming. The brine applying means includes a tank filled with brine of about 65–90% salt solution at about 15°–40° F. which receives the cheese ribbon to salt the cheese. Alternately, the brine applying means may include means for spraying a like brine solution to both sides of the cheese ribbon.

The apparatus further includes means for cooling the cheese ribbon. Although the brine applying means will result in some cooling, it is preferred that the primary cooling of the cheese ribbon take place downstream of the brine applying means. Primary cooling is accomplished by means of a glycol-filled cooling table over which the cheese ribbon passes. Alternately, a plurality of glycol-filled rollers or other cooling means may be employed.

The cutting or severing means cuts the cheese ribbon to produce a sliced, shredded and/or diced end product. The cutting or severing means may include a rotary knife which intermittently cuts the cheese ribbon transversely to its direction of movement to produce rectangular shaped slices, or a plurality of parallel cutters followed by a rotary knife which sever the cheese ribbon into a series of "strings", or a stamping means for punching out desired shapes from the cheese ribbon. The end product can thus be of varying shapes and weights depending upon the desired end use for the cheese. The apparatus also enables the manufacturer to produce an end product having any desired weight and shape to exact portions.

The present invention thus provides a method and apparatus for continuously producing cheese of the pasta filata type wherein exact portions of any desired shape and weight can be produced. The method and apparatus eliminates unnecessary waste, interim packaging, and substantially reduces the cost of manufacturing exact weight portions of cheese.

BRIEF DESCRIPTION OF THE DRAWING

The drawings illustrate the best most presently contemplated of carrying out the invention.

In the drawings:

FIG. 1 is a fragmentary schematic side view in elevation illustrating an apparatus for producing cheese of the pasta filata type in accordance with the method of the present invention;

FIG. 3 is a fragmentary perspective view illustrating a second method of cutting the cheese ribbon produced by the apparatus of FIGS. 1 and 2.

DESCRIPTION OF THE PREFERRED EMBODIMENTS

Figure 2:
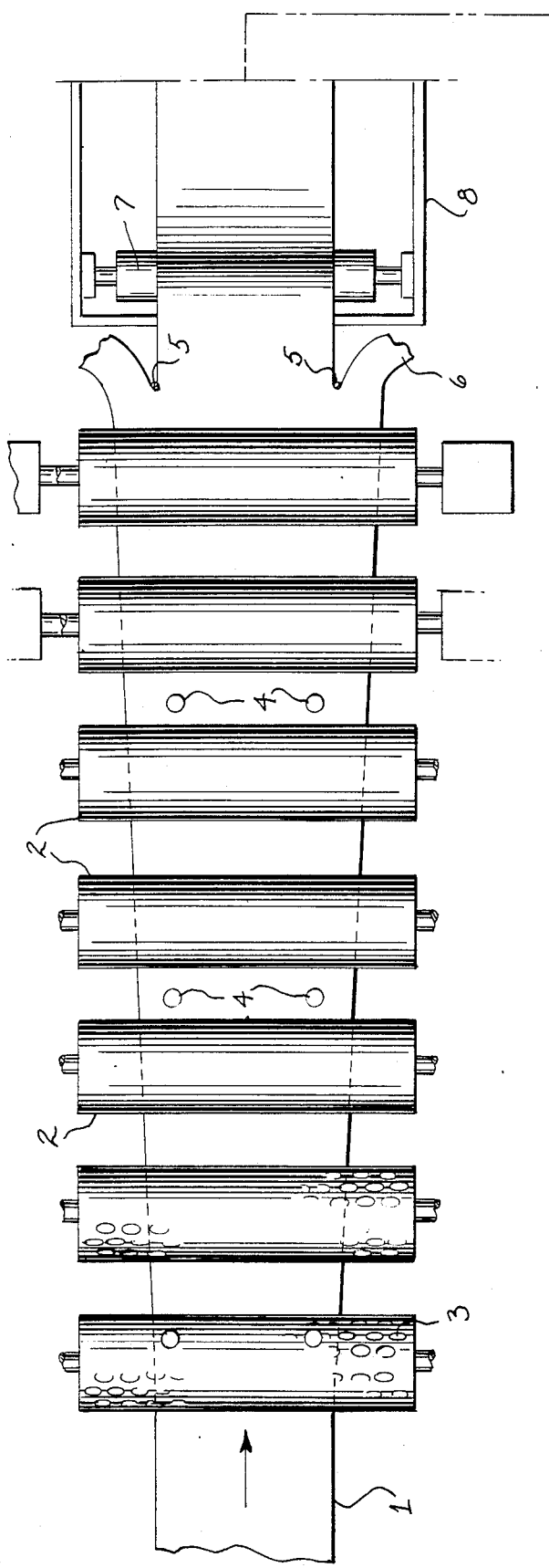
FIG. 2 is a fragmentary plan view of the apparatus of FIG. 1.

Referring now to the drawings, FIGS. 1 and 2 illustrate an apparatus for producing cheese of the pasta filata type. A pasta filata type cheese is a cheese such as mozzarella, provolone, blends thereof, or a cheese of this type blended with a cheese analog or imitation cheese. Pasta filata type cheese becomes "plastic" i.e. moldable and pliable when heated to a temperature range of between 120° F. and 150° F. whereas other type cheeses such as process types become molten when heated in this temperature range.

The manufacture of pasta filata type cheese involves cooking, mixing and stretching a curd of the pasta filata type in a cooking vessel (not shown) and extruding the material to form an extended ribbon 1 of cheese. The cheese is extruded at a temperature of from about 120° F. to about 160° F. The cheese ribbon 1 is then passed through a series of successively more closely spaced rollers 2 in order to roll the product to a desired thickness. As shown, the rollers 2 at the upstream end of this section of the apparatus are spaced further apart from one another than the rollers at the downstream end. The ribbon 1 passes through the nip formed between corresponding pairs of upper and lower rollers 2 and applies pressure to cheese ribbon 1 which is normal to the longitudinal direction of ribbon 1 and the path of movement thereof. Rollers 2 flatten the ribbon 1 of cheese by reducing the size of ribbon 1 in a dimension parallel to the direction of pressure application to a predetermined size corresponding to the desired thickness of the slices. It should be noted that the upstream rollers 2 are convex in shape thus enabling them to spread the cheese laterally while at the same time flattening ribbon 1. The downstream rollers 2 become progressively more cylindrical in shape. Also, as seen best in FIG. 2, rollers 2 may include a textured surface in the form of dimples 3. Dimples 3 knead the cheese in ribbon 1 and also provide sufficient frictional contact with ribbon 1 to drive ribbon 1. The space between rollers 2 is adjustable to any desired dimension in order to provide a ribbon 1 having the desired thickness.

As previously noted, ribbon 1 must be maintained at a temperature of between about 120° F. to about 160° F. In order to accomplish this, rollers 2 may be heated in any conventional manner so that contact with ribbon 1 maintains the heated state of the cheese. Additionally, a series of nozzles 4 are positioned above and below ribbon 1 and spray a heated fluid such as hot water against ribbon 1. Both the rollers 2 and the hot water should be maintained at a temperature of between about 120° F. to 160° F. so that ribbon 1 maintains its heated state wherein it is in a plastic condition.

After being flattened to its final thickness dimension, the lateral edges of ribbon 1 are cut square by means of a pair of cutters 5 which extend normal to the longitudinal direction of ribbon 1. Cutters 5 may comprise a pair of wires, "squeeze" knives, motorized kinves or other means that are adjustable so that the width of ribbon 1 may correspondingly vary to the desired dimension. The trimmed portions or rework 6 is fed back to the cooker. At this stage rework 6 can be recycled without any significant loss of product quality and integrity since it is not yet been cooled and salted.

Following the trimming of its edges, ribbon 1 passes over an idler roller 7 which is journalled in opposite sides of a tank 8 filled with brine 9. Brine 9 is about a 65-90% salt solution which is maintained at a temperature of about 15°–40° F. Ribbon 1 is then immersed in the brine bath which serves to salt and cool ribbon 1. Brining time is a maximum of about 15 minutes for ribbon 1. In contrast, brining time of typical blocks of such cheese is about 24 hours. Such a reduction is possible since there is much more cheese surface exposed to the brine solution to facilitate cooling and salting. As shown best in FIG. 1, ribbon 1 is passed through the brine solution in a relatively straight line with the least amount of bending possible since as the product is cooled it becomes less pliable possibly resulting in cracks and other unsightly surface mars if bent excessively.

As shown in FIG. 1, ribbon 1 exits from brine tank 8 by passing through the nip formed between a pair of rollers 10 and 11 which are journalled in opposite sides of tank 8. As shown, the upper roller 10 is the drive roller while the lower roller 11 is the idler roller.

Although passing ribbon 1 through brine tank 8 results in some cooling, it is preferred not to employ tank 8 as the sole cooling means for ribbon 1 since the salt content of ribbon 1 may become too high resulting in an unpalatable product. Thus, after salting, ribbon 1 is passed over a glycol-filled cooling table 23. Alternately, ribbon 1 may snake around a plurality of glycol-filled cooling rollers (not shown) or other cooling means.

After cooling and salting has been accomplished, the product is ready for final cutting. As shown in FIGS. 1 and 2, one method of cutting ribbon 1 includes the use of a rotary knife 12 which includes a blade 13 extending thereacross. As knife 12 rotates blade 13 rolls against the surface of a roller 14 positioned beneath knife 12 to cut ribbon 1 widthwise to form rectangular shaped slices 15. These slices 15 are then transported by a conveyor 16 for packaging and storage.

Another method of cutting ribbon 1 into "slices" is shown in FIG. 3. In this embodiment, a series of parallel spaced spart cutters 17 cut ribbon 1 to form a plurality of "strings" 18. As shown, cutters 17 extend in a direction normal to the direction of travel of ribbon 1. Strings 18 may then be cut transversely or widthwise if desired by the rotary knife 12. As shown, cutters 17 comprise disc-shaped knives mounted in spaced relation on a shaft 24 which in turn is rotated by a motor (not shown). Shaft 24 is rotated in the direction of movement of ribbon 1, i.e. if ribbon moves in the direction of arrow 25, shaft 24 is rotated counterclockwise in the direction of arrow 26 to provide a clean cut.

Figure 4:
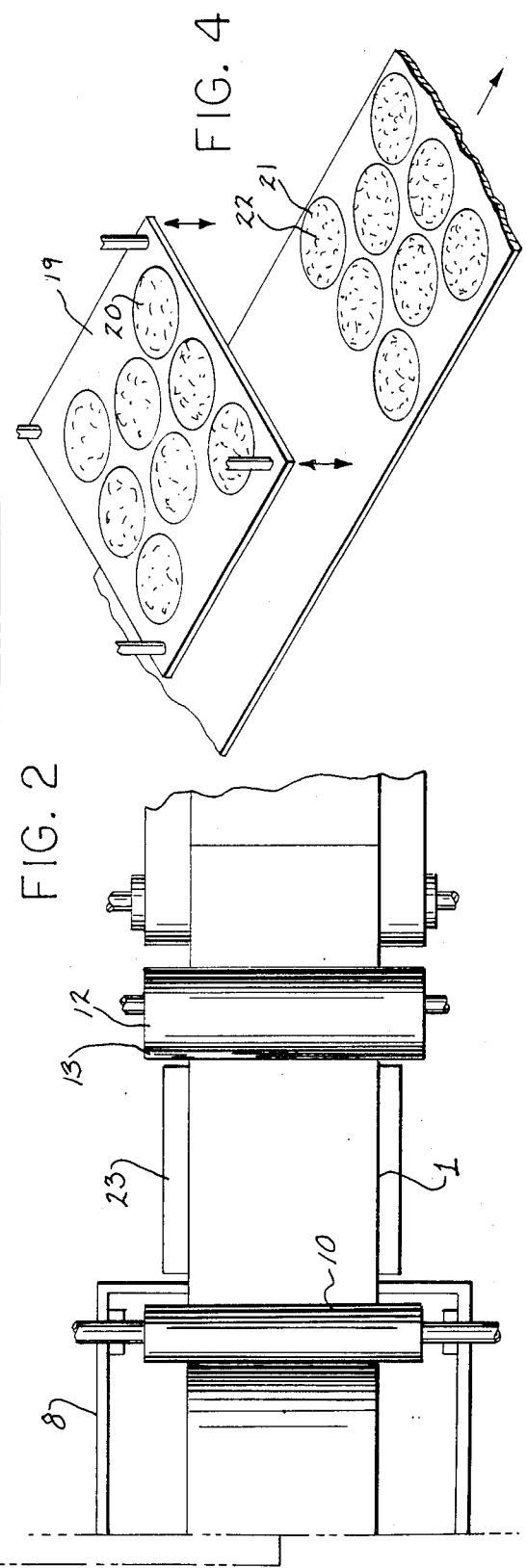
FIG. 4 is a fragmentary perspective view illustrating a third method of cutting the cheese ribbon.

FIG. 4 shows yet another method of producing "slices" of cheese from ribbon 1. In this embodiment, ribbon 1 is stamp cut to produce slices of any desired shape. As shown, a punch 19 has a plurality of circular dies 20 form thereon. When punch 9 is reciprocated against ribbon 1, dies 20 cut through ribbon 1 and form a plurality of circular slices 21. It should be noted that slices 21 also include a plurality of holes 22 formed therein by dies 20. These holes are necessary when slices 21 are utilized with pizza so that heat may escape through the cheese when the pizza is cooked.

The ribbon 1 could also be slit and cross-cut so as to produce shredded and/or diced cheese of variable proportions, cross-sections and weight. As used herein, the term "sliced" cheese includes "shredded" and/or "diced" cheese, and the term "slicing" includes "shredding" and/or "dicing" cheese ribbon 1.

A method for producing cheese of the pasta filata type has been illustrated and described. Various modifications and/or substitutions of the specific components described herein may be made without departing frm the scope of the invention. For example, instead of passing the ribbon 1 through a bath of brine which is physically contained within tank 8, the brine bath may be provided by a series of nozzles spraying the brining fluid against both sides of ribbon 1. The present invention thus provides a method for continuously producing cheese of the pasta filata type to accomplish portion control by providing an end product of various shapes to the exact desired size and weight.

I claim:

1. A method for producing thin portions of cheese of the pasta filata type, said portions having a desired thickness and a predetermined quantity of cheese, said method comprising the steps of:
   placing the cheese in a heated, deformable state;
   forming an extended ribbon of the cheese moving in a direction away from the point of formation;
   successively applying pressure to the moving heated, deformable ribbon of cheese in a single direction normal to the direction of movement, thereby reducing the size of the ribbon in a dimension parallel to the direction of pressure application to a desired thickness while simultaneously increasing the dimension of the ribbon through free and unrestrained expansion in a dimension that is normal to the direction of pressure application and to the direction of movement, whereby said pressure application forms a flattened ribbon of cheese; and
   severing the flattened ribbon into portions having the predetermined quantity of cheese.

2. The method according to claim 1 wherein the step of applying pressure to the cheese ribbon is further defined as passing the cheese through roller means.

3. The method according to claim 2 further defined as passing the ribbon of cheese through a series of roller means.

4. The method according to claim 2 further defined as passing the ribbon of cheese successively through a series of successively more closely spaced rollers.

5. The method according to claim 2 wherein said roller means applies a textured surface to the cheese for kneading the cheese and providing a localized varying of the pressure to the cheese.

6. The method according to claim 1 further defined as maintaining the heated state of the cheese while applying pressure to the cheese ribbon.

7. The method according to claim 2 further including the step of maintaining the heated state of the cheese while applying pressure to the cheese ribbon by subjecting the cheese ribbon to heated roller means.

8. The method according to claim 6 wherein the maintaining of the heated state of the cheese is further defined as applying a heated fluid to the ribbon of cheese.

9. The method according to claim 8 further defined as applying hot water to the cheese.

10. The method according to claim 1 further defined as including the step of trimming the edges of the flattened ribbon in the dimension normal to the direction of pressure application.

11. The method according to claim 10 further including the step of returning the trimmed portions of the cheese ribbon to the heated, deformable state for reforming into a ribbon of cheese.

12. The method according to claim 1 including the further step of applying a brining fluid to the ribbon of cheese at least after the pressure has been applied thereto.

13. The method according to claim 12 wherein the step of applying the brining fluid is further defined as conveying the ribbon through a bath of brining fluid.

14. The method according to claim 12 wherein the step of appying the brining fluid is further defined as spraying the brining fluid on the ribbon of cheese.

15. The method according to claim 12 wherein the application of the brining fluid further serves to cool the ribbon of cheese.

16. The method according to claim 1 further defined as cooling the ribbon of cheese at least after the pressure has been applied thereto.

17. The method according to claim 16 further defined as cooling the ribbon of cheese by applying a cooling fluid thereto.

18. The method according to claim 1 wherein the severing step is further defined as transversely cutting the ribbon of cheese to obtain portions of the predetermined quantity of cheese.

19. The method according to claim 1 wherein the severing step is further defined as cutting out portions of a desired form from the flattened ribbon of cheese to obtain portions of the predetermined quantity of cheese.

20. The method according to claim 19 further including the step of returning the portions of the flattened ribbon not comprising the portions to the heated deformable condition for reforming into a ribbon of cheese.

21. The method according to claim 1 further defined as longitudinally cutting the flattened ribbon of cheese and transversely cutting the longitudinally cut ribbon to obtain the portions.

* * * * *